(12) United States Patent
Schroeder

(10) Patent No.: US 8,268,954 B2
(45) Date of Patent: Sep. 18, 2012

(54) METHOD FOR MAKING COPOLYMERS OF LACTIDE AND A 1:4-3:6 DIANHYDROHEXITOL

(75) Inventor: Joseph David Schroeder, Minneapolis, MN (US)

(73) Assignee: NatureWorks LLC, Minnetonka, MN (US)

( * ) Notice: Subject to any disclaimer, the term of this patent is extended or adjusted under 35 U.S.C. 154(b) by 203 days.

(21) Appl. No.: 12/669,598

(22) PCT Filed: Aug. 7, 2008

(86) PCT No.: PCT/US2008/072435
§ 371 (c)(1),
(2), (4) Date: Jan. 19, 2010

(87) PCT Pub. No.: WO2009/021101
PCT Pub. Date: Feb. 12, 2009

(65) Prior Publication Data
US 2010/0197884 A1 Aug. 5, 2010

Related U.S. Application Data

(60) Provisional application No. 60/964,065, filed on Aug. 9, 2007, provisional application No. 60/965,223, filed on Aug. 17, 2007.

(51) Int. Cl.
*C08G 63/00* (2006.01)

(52) U.S. Cl. ........ 528/271; 514/471; 528/272; 528/480; 528/481; 528/491; 524/745; 524/784

(58) Field of Classification Search .................. 514/471; 528/271, 272, 480, 481, 491; 524/745, 784
See application file for complete search history.

(56) References Cited

U.S. PATENT DOCUMENTS

| | | | | |
|---|---|---|---|---|
| 5,066,772 A * | 11/1991 | Tang et al. | .................... | 528/354 |
| 5,798,435 A * | 8/1998 | Gruber et al. | ................. | 528/354 |
| 5,844,066 A * | 12/1998 | Kakizawa | ...................... | 528/354 |
| 5,994,478 A * | 11/1999 | Asrar et al. | .................... | 525/437 |
| 6,093,792 A * | 7/2000 | Gross et al. | .................... | 528/354 |
| 6,126,992 A * | 10/2000 | Khanarian et al. | ............. | 427/162 |
| 7,645,852 B2 * | 1/2010 | Terado et al. | ................. | 528/271 |
| 2008/0015331 A1 * | 1/2008 | Terado et al. | ................. | 528/271 |

FOREIGN PATENT DOCUMENTS

| | | | |
|---|---|---|---|
| EP | 1752482 A | | 2/2002 |
| EP | 1752482 A1 * | | 2/2007 |
| JP | 2007-146109 A | | 6/2007 |
| JP | 2007146019 A * | | 6/2007 |
| WO | WO 9954119 A1 * | | 10/1999 |
| WO | 2008/056136 A | | 11/2008 |

OTHER PUBLICATIONS

Synthesis and Characterization of Isosorbide Carbonate:Lactide Copolymers, ACS, 2007.*

* cited by examiner

*Primary Examiner* — James J Seidleck
*Assistant Examiner* — Peter A Salamon
(74) *Attorney, Agent, or Firm* — Gary C Cohn, PLLC

(57) ABSTRACT

Polyester-carbonate copolymers are prepared by copolymerizing lactide with a 1:4-3:6 dianhydrohexitol in the presence of a carbonate precursor and a polymerization catalyst. The copolymers have an elevated glass transition temperature, relative to polylactide resins.

11 Claims, No Drawings

METHOD FOR MAKING COPOLYMERS OF LACTIDE AND A 1:4-3:6 DIANHYDROHEXITOL

This application claims priority from U.S. Provisional Application Nos. 60/964,065, filed 9 Aug. 2007, and 60/965,223, filed 17 Aug. 2007.

This invention relates to a process for preparing carbonate-ester copolymers from lactide and a 1:4-3:6 dianhydrohexitol.

Polymers of aliphatic hydroxycarboxylic acids are well known and are produced commercially. The largest volume polymer of this type is a polymer of lactic acid, which is referred to a "PLA". PLA is made in commercial quantities by polymerizing lactide, which is a cyclic dimer of lactic acid (with removal of 2 molecules of water).

PLA has been used for many years in medical applications, because it tends to be bioresorbable, and so can be broken down in the human body to form innocuous decomposition products. Sutures, hemostatic acid, intraosseous implants and slow-release drug delivery systems have all been developed based on polymers of lactide or lactic acid.

More recently, PLA has found use in commodity applications such as, for example, films, thermoformed articles, bottles and fibers. PLA has attributes that make its use appealing from an environmental standpoint. PLA can be produced using annually renewable crops such as corn (among others) as a feedstock. Sugars that occur naturally in the feedstock, or which are produced by breaking down carbohydrates in the feedstock, are fermented to lactic acid, which is then used to produce lactide and the PLA resin. Thus, PLA does not depend on fossil carbon sources (such as petroleum, coal or natural gas) as a feedstock for its monomers. PLA has the additional environmental benefit of being compostable. Under proper conditions, PLA will naturally degrade to form carbon dioxide.

The glass transition temperature ($T_g$) of PLA is usually in the range of about 55-62° C. Because of this, PLA has found limited use in applications that involve exposure to temperatures above about 60° C. It would be desirable to increase the $T_g$ of PLA resins, in order to make them more suitable for certain applications that require exposure to somewhat elevated temperatures.

One approach to increasing the $T_g$ of PLA is to form copolymers with a higher $T_g$ material. Because PLA resins are chemically polyesters, they can undergo transesterification reactions with other polyesters and with polycarbonates to form copolymers. In addition, it is possible to copolymerize lactide with another cyclic ester or a cyclic carbonate to form random or block copolymers. Examples of the latter approach are described, for example, in U.S. Pat. Nos. 5,066,772 and 6,093,792. These copolymers have a disadvantage in that the comonomers, or the other polyester or polycarbonate, are usually based on non-renewable feedstocks, and so some of the environmental advantage is lost.

EP 1 752 482 describes polyester-carbonate copolymers which have segments obtained from a poly(hydroxycarboxylic acid) such as PLA and segments derived from a poly(isosorbide carbonate). Like lactic acid and lactide, isosorbide can be produced from sugars and cellulosic materials, and for that reason the isosorbide copolymers are of interest. EP 1 752 482 describes two methods for making the copolymers. The first method is a transesterification route, using PLA and an isosorbide carbonate polymer as starting materials. This route produces copolymers with unknown block lengths, depending on the extent of the transesterification reaction. A problem with this approach is that very significant molecular weight degradation is seen. The copolymer that is obtained has a molecular weight far lower than that of either starting material. This makes the overall production process economically unattractive, as the starting materials are polymerized to high molecular weight, which is then lost in the transesterification step. A second approach described in EP 1 752 482 is to form A-B-A type block copolymers by polymerizing a cyclic dimer of the hydroxycarboxylic acid onto the poly(isosorbide polycarbonate). This creates a polymer mixture that exhibits multiple thermal phase transitions, which indicates that a non-uniform blend of materials is obtained.

WO 2008/056136 also describes a copolymer of lactic acid, isosorbide and a polycarboxylic acid having 3 or more acid groups. This copolymer is a highly crosslinked material. Lactide is not mentioned as a starting material for making this copolymer. In addition, the copolymer is not a thermoplastic material that is suitable for most thermoplastics processing.

It would be desirable to provide an economical and efficient process for preparing a polyester-carbonate copolymer having repeating lactide units and 1:4-3:6 dianhydroxhexitol carbonate segments, which has a $T_g$ of at least 70° C. This invention is a process comprising polymerizing a 1:4-3:6-dianhydrohexitol, lactide and a carbonate precursor in the presence of at least one polymerization catalyst, and under polymerization conditions including an elevated temperature and a subatmospheric pressure, to form a polyester-carbonate containing dianhydrohexitol repeating units and lactide repeating units.

The process of the invention can be carried out as a one-step process or a two-step process. In the one-step process, the 1:4-3:6 dianhydohexitol, lactide and carbonate precursor are formed into a mixture in the presence of at least one polymerization catalyst, and the mixture is subjected to polymerization conditions. The one-step process permits the polyester-carbonate polymer to be produced in a single polymerization step, without separate formation of polymeric starting materials.

In the two-step process, the 1:4-3:6 dianhydrohexitol and lactide are reacted together in a first step to form a prepolymer that contains ester groups and terminal hydroxyl groups. The prepolymer is then reacted with the polycarbonate precursor in a second step, in the presence of the polymerization catalyst and under polymerization conditions that include an elevated temperature and subatmospheric temperature, to from the polyester-carbonate.

In preferred aspects, the polyester-carbonate is subsequently reacted with a chain extender to produce a chain-extended polymer having a higher molecular weight.

The process of the invention provides an economical method for preparing polyester-carbonates of lactide and a 1:4-3:6-dianhydrohexitol. The process does not require that high molecular weight starting materials be formed. In addition, the process of the invention can produce highly random polymers, in which the 1:4-3:6-dhanhydrohexitol repeating units are distributed somewhat randomly throughout the polymer chain, rather than mainly as blocks of repeating isosorbide carbonate units.

In another aspect, this invention is a process comprising forming a prepolymer of a 1:4-3:6 dianhydrohexitol and lactide, wherein the prepolymer contains ester groups and an average of at least two terminal hydroxyl groups per molecule, and then chain extending the prepolymer by contacting it under polymerization conditions with at least one chain extender.

1:4-3:6 dianhydrohexitol compounds are the 1:4-3:6 dianhydrides of sorbitol, mannitol or iditol, each being bicyclic compounds having the chemical formula $C_6H_{10}O_4$, but differing in their stereochemistry. These dianhydrohexitols are known as isosorbide, isomannide and isoidide, respectively. Isomannide and isoidide each have two equivalent hydroxyl groups. Isosorbide has two nonequivalent hydroxyl groups (i.e., 2-exo and 5-endo), and is preferred. The structure of isosorbide can be represented as:

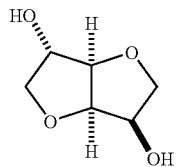
(I)

The carbonate precursor is a material that reacts with two molecules of hydroxyl-containing compounds to form a carbonate linkage. The carbonate precursor typically takes the form

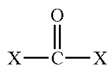
(II)

wherein each X is a leaving group. The X groups may be the same or different from each other. Examples of X groups are halogen (especially chlorine or bromine), or an alkoxy or aryloxy group having up to 12, preferably up to six carbon atoms. The X groups are preferably such that the carbonate precursor is a liquid at 25° C., or a solid having a melting temperature of 100° C. or less. The X groups also preferably form a compound of the form X—H, which has a boiling temperature (at 1 atmosphere pressure) of 220° C. or less and preferably 190° C. or less. Examples of suitable carbonate precursors are phosgene, dimethylcarbonate, diethylcarbonate, diphenyl carbonate and phenylchloroformate, and the like. Carbonate precursors that are relatively low in volatility are especially desirable because of handling considerations. Diphenyl carbonate is a particularly preferred carbonate precursor.

The structure of lactide is shown in structure III, with stereochemistry not being indicated.

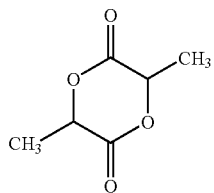
(III)

Lactide contains two chiral carbon atoms and thus can exist in three stereoisomeric forms, S,S-lactide, R,R-lactide, and meso-lactide. The polymerization of lactide gives rise to repeating

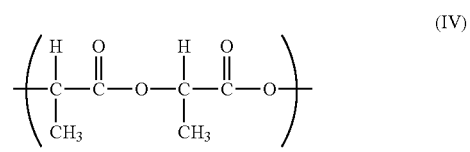
(IV)

units (lactide units) in the product copolymer. Each lactide unit contains two polymerized lactic acid units. The lactide units may consist of two consecutive S-lactic acid units (formed by polymerizing S,S-lactide), two consecutive R-lactic acid units (formed by polymerizing R,R-lactide), one S-lactic acid and one R-lactic acid (formed by polymerizing meso-lactide), or mixtures of these three types.

Another cyclic ester can be copolymerized with the other monomers, in addition to the ingredients already described. The cyclic ester is, for example, a lactone or cyclic dimer of an α-hydroxycarboxylic acid. The cyclic ester may have one (in the case of a lactone), two (in the case of a cyclic dimer), or a greater number of ester groups in the ring structure. Examples of suitable cyclic esters include paradioxanone, dioxetane-2-one, ε-caprolactone, 4-valerolactone, tetramethyl-1,4-dioxane-2,5-dione and glycolide.

The molar ratio of the 1:4-3:6 dianhydrohexitol to all cyclic esters (including the lactide) may vary significantly. Generally, a higher molar proportion of the 1:4-3:6 dianhydrohexitol will result in a higher $T_g$ in the copolymer. Little increase in $T_g$ is seen, relative to that of the polymerized cyclic esters alone, when the molar ratio of cyclic esters (including the lactide) to the 1:4-3:6 dianhydrohexitol compound is greater than about 8:1. Preferably this ratio does not exceed 5:1. This ratio may be as low as 1:10. A preferred range is from 5:1 to 1:2. A more preferred range is from 5:1 to 1:1.

The molar ratio of the additional cyclic ester to lactide may be from 0 to 5:1, and is more preferably from 0 to 1:1 and even more preferably from 0 to 0.25:1.

In some aspects of the invention, the copolymer is prepared in a single reaction step by combining the 1:4-3:6 dianhydrohexitol compound, carbonate precursor, lactide and any optional, other cyclic esters, and bringing the mixture to polymerization conditions in the presence of a polymerization catalyst. In this aspect of the invention, the molar ratio of the 1:4-3:6 dianhydrohexitol to polycarbonate precursor in the reaction is maintained at about 1:1. Significant excesses of one or another will substantially limit the growth of carbonate segments in the copolymer. Thus the molar ratio of 1:4-3:6 dianhydrohexitol to polycarbonate precursor may be from 0.95:1 to 1.05:1, preferably from 0.98:1 to 1.02:1, even more preferably from 0.99:1 to 1.01:1, and still more preferably from 0.995:1 to 1.005:1.

The polymerization can be conducted batch-wise, semi-continuously or continuously. Continuous stirred-tank reactors (CSTRs) and tube or pipe reactors are suitable types of polymerization vessels. A series of CSTRs or tube or pipe reactors may be used to conduct the polymerization in stages. This permits additives to be introduced at specific stages in the polymerization process if desired, and also allows for different reaction conditions to be used at different stages of the polymerization, if desired.

Polymerization conditions include an elevated temperature and subatmospheric pressure. Suitable polymerization temperatures may be 100° C. to 250° C., preferably 150° C. to 230° C. and even more preferably 180 to 220° C. Subatmospheric pressures facilitate removal of volatile reaction by-products, which is needed to build molecular weight in the copolymer. A preferred range of reaction pressures is from 1 to 100 mm Hg (0.13 to 13.3 kPa).

The reaction is conducted for a sufficient period of time to consume the carbonate precursor and build the molecular weight of the copolymer. Reaction by-products are produced as the carbonate precursor reacts. A predominant by-product takes the form X—H, where X is as described before. The X—H compound is typically HCl, HBr, an alkanol or phenol. These reaction by-products are removed as they are produced, and the consumption of the carbonate precursor can be followed if desired by measuring the quantity of the removed by-products.

Molecular weight and conversion are controlled by polymerization time and temperature, the equilibrium between the starting materials and the polymer, and the removal of reaction by-products formed as the carbonate precursor reacts.

The reaction may be conducted neat or in a solvent. If a solvent is used, it should be a material that is a liquid under the temperature and pressure conditions of the reaction. Diphenyl ether is a suitable reaction solvent.

Suitable polymerization catalysts include various tin compounds such as $SnCl_2$, $SnBr_2$, $SnCl_4$, $SnBr_4$, SnO, tin(II)bis(2-ethyl hexanoate), butyltin tris(2-ethyl hexanoate), hydrated monobutyltin oxide, dibutyltin dilaurate, tetraphenyltin and the like; PbO, zinc alkoxides, zinc stearate, organoaluminum compounds such as aluminum alkoxides, organoantimony compounds such as antimony oxide, antimony triacetate and antimony(2-ethyl hexanoate), organobismuth compounds such as bismuth(2-ethyl hexanoate), calcium stearate, magnesium stearate, certain yttrium and rare earth compounds such as are described in U.S. Pat. No. 5,208,667 to McLain et al, and the like. Catalysts are used in catalytically effective amounts, which depend somewhat on the particular catalyst, but are usually in the range of from about 1 mole of catalyst to about 500-50,000 moles of monomers (i.e., the lactide, any other cyclic ester and the 1:4-3:6 dianhydrohexitol). Preferred catalyst concentrations are not more than one mole of catalyst per 5000 moles of monomers, and especially not more than one mole of catalyst per 10,000 moles of monomers.

The copolymer made in the one-step process will contain repeating units derived from lactide and the 1:4-3:6 dianhydrohexitol. These repeating units are linked through carbonate or ester linkages, with both types being present in the copolymer. The carbonate linkages are believed to be distributed more or less randomly throughout the polymer chain. Carbonate linkages can be positioned between adjacent 1:4-3:6 dianhydrohexitol repeating units, between adjacent lactide repeating units, or between a 1:4-3:6 dianhydrohexitol unit and an adjacent lactide repeating unit. All three types of carbonate linkages may be present in some proportion. Ester linkages can be positioned between adjacent lactide repeating units, or between a lactide repeating unit and an adjacent 1:4-3:6 dianhydrohexitol repeating unit. Again, both types of linkages may be present in some proportion.

The copolymer produced in the one-step process should have a number average molecular weight ($M_n$) of at least 5,000. The $M_n$ is preferably at least 10,000 and is more preferably at least 15,000. The $M_n$ can be any higher value, provided that the copolymer remains melt-processable. Thus, $M_n$ can be up to, for example, 30,000, 50,000, 70,000, 100,000, 200,000 or 300,000.

The copolymer suitably has a $T_g$ of at least 70° C., more preferably at least 75° C., and even more preferably at least 80° C. If the copolymer is to be used in applications in which it will be in contact with boiling water (as in many food packaging or service applications), the $T_g$ should be at least 105° C. and even more preferably at least 110° C. The copolymer may have a $T_g$ of up to 125° C. or more.

A preferred copolymer prepared in the one-step process contains lactide and 1:4-3:6 dianhydrohexitol repeating units in a ratio of from 5:1 to 1:2, has a $T_g$ of at least 70° C., and has, prior to any subsequent chain extension, an $M_n$ of from 10,000 to 100,000. A more preferred copolymer contains lactide and isosorbide repeating units in a ratio of 5:1 to 1:1, has a $T_g$ of from 75° C. to 110° C. and has, prior to any subsequent chain extension, an $M_n$ of from 15,000 to 70,000.

The resulting copolymer contains metal catalyst residues. The metal catalyst residues can catalyze copolymer degradation reactions during subsequent melt-processing operations, and so are preferably are removed from the copolymer or are deactivated. Deactivation is generally preferred to catalyst removal based on cost considerations. Catalyst residues can be deactivated by blending a catalyst deactivation agent into the copolymer. Suitable catalyst deactivating agents are described, for example, in U.S. Pat. No. 6,114,495. These include multifunctional carboxylic acids, and in particular polyacrylic acid. In addition, certain partially esterified acid-functional polymers or copolymers can be used to deactivate the catalyst.

An equilibrium will be established between the copolymer and free lactide. This can limit the build-up of molecular weight and produce a copolymer containing a certain amount of free lactide. The free lactide provides some plasticizing effect that is often undesirable, and also tends to coat the surfaces of polymer processing equipment. For these reasons, the copolymerization process typically includes a devolatilization step during which the free lactide content of the polymer is reduced, preferably to less than 1% by weight, and more preferably less than 0.5% by weight. Other low molecular weight by-products and residual starting materials are usually removed during the devolatilization process.

If desired, branching can be introduced into the copolymer. This can be done during the copolymerization reaction, or in some subsequent step. Various branching agents are useful, including, for example, an epoxidized fat or oil, as described in U.S. Pat. No. 5,359,026; various peroxides, as described in U.S. Pat. Nos. 5,594,095 and 5,798,435; polyfunctional initiators as described in U.S. Pat. Nos. 5,210,108 and 5,225, 521, GB 2277324 and EP 632 081; bicyclic diesters and/or dicarbonates, as described in WO 02/100921; and an acrylate polymer or copolymer containing an average of from about 2 to about 10 free epoxide groups/molecule.

The $M_n$ of the copolymer can be increased by coupling the copolymer with a difunctional coupling agent. The difunctional coupling agent contains two functional groups that can each react with a terminal group on the copolymer, thereby linking copolymer molecules to form a coupled copolymer that has an increased $M_n$. The amount of increase in $M_n$ will depend on the molar amount of coupling agent that is used, per mole of copolymer, and of course on the extent to which the coupling agent reacts with the copolymer. Thus, for example, the molar ratio of copolymer to coupling agent may range from 10:1 to 1:1, and is more generally from 3:1 to 1:1. $M_n$ can be increased, for example, to about 1.25 to 8 times that of the starting copolymer. A more typical increase is from 3 to 7 times that of the starting copolymer. In absolute terms, the coupled copolymer suitably has a $M_n$ of at least 30,000, more preferably at least 50,000, even more preferably at least 70,000, and can be as much as 1 million, 500,000, 300,000 or 150,000. Some increase in polydispersity (ratio of weight average molecular weight ($M_w$) to $M_n$) is usually seen as the copolymer is coupled.

Suitable coupling agents include, for example, diisocyanate compounds, diepoxides, dicarboxylic acids, dianhydrides of tetracarboxylic acids, compounds having two primary and/or secondary amino groups, as well as other compounds having two functional groups that react to form covalent bonds with carboxylic acid and/or hydroxyl groups.

The coupling reaction can be performed neat or in the presence of a solvent. Depending on the particular coupling agent and copolymer, it may or may not be necessary to heat the mixture of copolymer and coupling agent in order to promote the coupling reaction. Similarly, the temperature that is needed to promote the reaction will depend on the particular coupling agent and the particular copolymer. Heating up to 250° C. can be used if needed. However, some molecular weight degradation is often seen when the copolymer is subjected to high temperatures, and this can offset the molecular weight increase that is caused by the coupling reaction. Therefore, it is generally preferred to select time and temperatures conditions to minimize unwanted molecular weight degradation. Preferred temperatures are above the glass transition temperature of the copolymer (if neat) but less than 200° C. and even more preferably less than 150° C. If the coupling reaction is performed in a solvent, lower temperatures can be used. It is possible to conduct the coupling reaction during a melt-processing operation. Thus, for example, the coupling agent can be added to a melt of the copolymer as the copolymer is being melt-processed into a finished article.

In the two-step process, the lactide and 1:4-3:6 dianhydrohexitol are pre-reacted in a first step to form an oligomer. The oligomer contains ester groups and terminal hydroxyl groups. In a second step, the oligomer is reacted with the carbonate precursor to form the product copolymer. The carbonate precursor reacts with hydroxyl groups on two oligomer molecules to form a carbonate linkage, thereby extending the polymer chain and increasing molecular weight.

In the two-step process, the molar ratio of 1:4-3:6 dianhydrohexitol to lactide is no greater than about 1:1, as no more than one mole of the 1:4-3:6 dianhydrohexitol will react with a mole of lactide. The molar ratio in the two-step process is preferably from 1:1 to 1:10 and more preferably from 1:1 to 1:5.

The oligomer formed in the first step can be represented by the structure

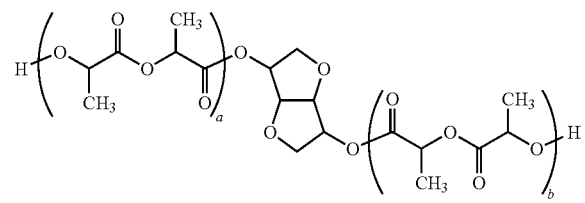

wherein a is zero or a positive number and b is at least one. The values of a and b combined are preferably from 1 to 10 and more preferably from 1 to 5. In most cases, the oligomer will include a mixture of species having various values of a and b.

The oligomerization reaction is suitably conducted at an elevated temperature as described before, and a polymerization catalyst as described before is preferably present. Subatmospheric pressures are generally not necessary in this step, as the reaction is an addition reaction that does not produce volatile reaction by-products.

In the two-step process, the oligomer is contacted with a carbonate precursor to form carbonate linkages between oligomer molecules and in that manner extend the polymer chain. This reaction is performed under conditions as described with regard to the one-step process. Up to about one mole of carbonate precursor is used per every two equivalents of hydroxyl groups in the oligomer, although lesser or greater amounts of the carbonate precursor can be used if a lower molecular weight polymer is desired.

The copolymer produced in the two-step process also should have a number average molecular weight ($M_n$) of at least 5,000. The $M_n$ is preferably at least 10,000 and is more preferably at least 15,000. The $M_n$ can be any higher value, provided that the copolymer remains melt-processable. Thus, $M_n$ can be up to, for example, 30,000, 50,000, 70,000, 100,000, 200,000 or 300,000.

The copolymer suitably has a $T_g$ of at least 70° C., more preferably at least 75° C., and even more preferably at least 80° C. If the copolymer is to be used in applications in which it will be in contact with boiling water (as in many food packaging or service applications), the $T_g$ should be at least 105° C. and even more preferably at least 110° C. The copolymer may have a $T_g$ of up to 125° C. or more.

In a variation of the two-step process, the oligomer can be reacted with a chain extender (instead of the carbonate precursor) to form a higher molecular weight polymer. The chain extender is a material having at least two, preferably exactly two, functional groups per molecule. The functional groups are groups that react with a hydroxyl group to from a covalent bond between the chain extender molecule and the oligomer. Examples of such functional groups include isocyanate, carboxylic acid, carboxylic acid ester, carboxylic acid anhydride, carboxylic acid halide, epoxide, and similar groups. The chain-extended copolymer should have a number average molecular weight ($M_n$) of at least 5,000. The $M_n$ is preferably at least 10,000 and is more preferably at least 15,000. The $M_n$ can be any higher value, provided that the copolymer remains melt-processable. Thus, $M_n$ can be up to, for example, 30,000, 50,000, 70,000, 100,000, 200,000 or 300,000.

In another variation of the two-step process, the oligomer can be mixed with another hydroxyl-terminated oligomer or polymer and the mixture chain extended to form a block copolymer of the two materials. The other hydroxyl-terminated oligomer can be a polymer of lactide or any other hydroxyl-terminated polymer or oligomer. The other hydroxyl terminated oligomer or polymer preferably contains approximately 2.0 hydroxyl groups per molecule if a linear reaction product is desired. It can have a higher hydroxyl functionality if branching is desired. The oligomer of the 1:4-3:6 dianhydrohexitol preferably constitutes from 30 to 99.9% of such a mixture of starting oligomers or polymers.

In either the one-step or two-step process, a portion of the 1:4-3:6 dianhydrohexitol can be replaced with one or more other diols. The other diol can be aliphatic, aromatic or cycloaliphatic. If a mixture of the 1:4-3:6 dianhydrohexitol and another diol is used, the 1:4-3:6 dianhydrohexitol preferably constitutes at least 30, more preferably at least 50 and even more preferably at least 75 mole-percent of the mixture, and may constitute up to 99.9% thereof. In this variation, the molar ratio of all of the diol mixture to polycarbonate precursor in the reaction is maintained at from 0.95:1 to 1.05:1, preferably from 0.98:1 to 1.02:1, even more preferably from 0.99:1 to 1.01:1, and still more preferably from 0.995:1 to 1.005:1.

In another variation of the one-step process or two-step process, a portion of the carbonate precursor can be replaced with one or more dicarboxylic acids, dicarboxylic acid ester, dicarboxylic acid halides or dicarboxylic acid anhydrides. This produces a mixed ester-carbonate. If a mixture of the carbonate precursor and one or more dicarboxylic acids, dicarboxylic acid ester, dicarboxylic acid halides or dicarboxylic acid anhydrides is used, the carbonate precursor preferably constitutes at least 30, more preferably at least 50 and even more preferably at least 75 mole-percent of the mixture, and may constitute up to 99.9% thereof.

The copolymer resulting from the foregoing processes is a thermoplastic material that can be used in various melt processing operations to produce a variety of products. The copolymer can be, for example, thermoformed to make articles such as deli trays and clamshells; formed into bottles using techniques such as blow molding and injection stretch blow molding; injection molded into a wide range of articles; spun into fibers (including staple fibers, monofilament fibers, blended fibers, textured fibers, bicomponent fibers, yarns and the like); extruded blown or cast into films, which may be unoriented, monoaxially oriented or biaxially oriented; extruded into foam; blow molded to form other hollow articles; compression molded; sheet molded; extruded to form extrusion coatings; formed into paper coatings; and also can be used in other melt processing methods.

The copolymer can be compounded with additives of many types, including antioxidants, preservatives, catalyst deactivators, stabilizers, plasticizers, fillers, nucleating agents, colorants of all types and blowing agents. The copolymer may be blended with other resins, and laminated or coextruded to other materials to form complex structures.

The following examples are provided to illustrate the invention but are not intended to limit the scope thereof. All parts and percentages are by weight unless otherwise indicated.

EXAMPLE 1

Isosorbide (12 g, 82 mmol), diphenyl carbonate (18 g, 82 mmol) and lactide (61 g, 420 mmol) are combined and mixed with tin di(2-ethylhexanoate) (150 µL, 0.46 mmol). The reaction mixture is heated to 180° C. for 30 minutes at atmospheric pressure, then for 1 hour at 180° C. and 100 mm Hg pressure, and then 30 more minutes at 180° C. and 55 mm Hg pressure. The temperature is then increased to 210° C. and the sample held at that temperature for one hour at 5 mm Hg pressure. A copolymer having an $M_n$ of 18,400 and a $T_g$ of 70° C. is obtained.

EXAMPLE 2

Copolymer Example 2 is prepared in the general manner described in Example 1, except that the molar ratio of isosorbide, diphenyl carbonate and lactide is 1:1:2. Isosorbide (30 g, 205 mmol), diphenyl carbonate (44 g, 205 mmol) and lactide (59 g, 410 mmol) are combined with tin(di-2-ethylhexanoate) (300 µL, 0.92 mmol). The resulting copolymer having an $M_n$ of 9800 and a $T_g$ of 90° C. is obtained.

EXAMPLE 3

Isosorbide (30 g, 205 mmol), diphenyl carbonate (44 g, 205 mmol) and lactide (59 g, 410 mmol) are combined at a molar ratio of 1:1:2 and dissolved in diphenyl ether (70 mL). Tin di(2-ethylhexanoate) (330 µL, 1 mmol) is mixed in. The mixture is then heated to 180° C. for 2 hours at 30 mm Hg pressure, and then for an additional 1.5 hours at 180° C. and 5 mm Hg pressure. This results in removal of phenol and diphenyl ether. The resulting copolymer has an $M_n$ of 6900 and a $T_g$ of 72° C. In this case, it is believed that the somewhat low molecular weight of the copolymer suppresses its $T_g$ somewhat.

EXAMPLE 4

Copolymer Example 4 is prepared in the same general manner as described in Example 3, except that the molar ratio of isosorbide, diphenyl carbonate and lactide is 1:1:5. The resulting copolymer has an $M_n$ of 19,300 and a $T_g$ of 84° C.

EXAMPLE 5

Copolymer Example 5 is prepared in the same general manner as described in Example 3, except the molar ratio of isosorbide, diphenyl carbonate and lactide is 1:1:0.5. The resulting copolymer has an $M_n$ of 18,200 and a $T_g$ of 124° C.

EXAMPLE 6

A copolymer is prepared in the same general manner as described in Example 3. It has an $M_n$ of about 18,000 and a $T_g$ of about 90° C. 5 grams (0.278 mmol) of this copolymer are dissolved in 50 grams of chloroform, and 0.272 mmol of 1,6-hexamethylenediisocyanate is added. The mixture is permitted to react at 60° C. for 24 hours to produce a coupled product. The coupled product has a $M_n$ of 30,600.

EXAMPLE 7

Example 6 is repeated, this time increasing the amount of 1,6-hexamethylenediisocyanate to 0.408 mmol, and reducing the reaction time to 4 hours. $M_n$ is increased in this manner to about 35,000. Increasing the reaction time to 24 hours results in a small further increase in $M_n$ to about 39,800.

EXAMPLE 8

Example 6 is repeated, this time increasing the amount of 1,6-hexamethylenediisocyanate to 0.494 mmol, and reducing the reaction time to 4 hours. $M_n$ is increased in this manner to about 28,500. Increasing the reaction time to 24 hours results in a small further increase in $M_n$ to about 33,500.

EXAMPLE 9

5 grams (0.278 mmol) of the starting copolymer described in Example 5 are dissolved in 15 grams of diphenylether, and 0.408 mmol of 1,6-hexamethylenediisocyanate are added. The mixture is permitted to react at 60° C. for 1 hour to produce a coupled product that has a $M_n$ of 22,500. If the mixture is permitted to react for another 2 hours, molecular weight degradation is seen, resulting in an $M_n$ of only 22,000

It will be appreciated that many modifications can be made to the invention as described herein without departing from the spirit of the invention, the scope of which is defined by the appended claims.

What is claimed is:

1. A process comprising polymerizing a 1:4-3:6-dianhydrohexitol, lactide and a carbonate precursor in one step by forming a mixture of the 1:4-3:6-dianhydrohexitol, lactide, carbonate precursor, and at least one polymerization catalyst, and subjecting the mixture to polymerization conditions including an elevated temperature and a subatmospheric pressure to form a polyester-carbonate containing randomly distributed dianhydrohexitol carbonate repeating units and lactide repeating units.

2. The process of claim 1, wherein the molar ratio of the lactide to the 1:4-3:6-dianhydrohexitol is from 5:1 to 1:2.

3. The process of claim 2, wherein the polyester-carbonate has a $T_g$ of 75° C. to 110° C.

4. The process of claim 3, wherein the 1:4-3:6-dianhydrohexitol is isosorbide.

5. The process of claim 4, wherein the molar ratio of the lactide to the 1:4-3:6-dianhydrohexitol is from 5:1 to 1:1.

6. The process of claim 1 wherein the carbonate precursor has the structure

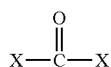 (II)

wherein each X is independently halogen or an alkoxy or aryloxy group having up to 12 carbon atoms.

7. The process of claim 6, wherein the carbonate precursor is diphenylcarbonate.

8. The process of claim 1, wherein the polyester-carbonate has an $M_n$ of from 10,000 to 100,000.

9. The process of claim 1, further comprising coupling the polyester-carbonate with a difunctional coupling agent.

10. The process of claim 9, wherein the coupled polyester-carbonate has an $M_n$ of from 50,000 to 150,000.

11. The process of claim 9, wherein the difunctional coupling agent is a diisocyanate compound, a diepoxide, a dicarboxylic acid, a dianhydride of a tetracarboxylic acid, or a compound having two primary or secondary amino groups.

* * * * *